Patented June 19, 1923.

1,459,078

UNITED STATES PATENT OFFICE.

ARMSTEAD M. ALEXANDER, OF INDEPENDENCE, MISSOURI.

CONFECTION AND METHOD OF MAKING THE SAME.

No Drawing.    Application filed September 21, 1922.   Serial No. 589,707.

*To all whom it may concern:*

Be it known that I, ARMSTEAD M. ALEXANDER, a citizen of the United States, residing at Independence, in the county of Jackson and State of Missouri, have invented certain new and useful Improvements in Confections and Methods of Making the Same; and I do declare the following to be a full, clear, and exact description of the invention, such as will enable others skilled in the art to which it appertains to make and use the same.

This invention relates to a method of preparing a confection as well as the article resulting from the carrying out of the method.

The confection is in the form of a frozen cream in which are divided particles or flakes of chocolate, the flakes maintaining their identity in the frozen cream in contradistinction to the ordinarily prepared chocolate ice cream in which the chocolate combines with the cream as an emulsion. The object of the invention is to provide a distinctive ice cream in which the main vehicle or base will preferably be vanilla into which is mechanically mixed or associated flakes or particles of chocolate so that the flakes or particles of chocolate are held in suspension in the frozen cream as distinctive elements without losing their identity. When the confection is being consumed, the base or main vehicle will melt in the mouth of the consumer just a little faster than will the chocolate particles. As a result the consumer gets the effect of the flavor of both the main vehicle and the chocolate as distinguishable one from the other.

In carrying out the invention I prefer to first prepare the base or vehicle. Any known method may be used for doing this; for example, the ordinary, well known formula of preparing vanilla ice cream may be followed and the ingredients in a fluid state may be mixed and then the temperature of the main vehicle or base may be reduced sufficiently, for example, below freezing. In actual practice I recommend a temperature of about 29 degrees F., above zero.

The chocolate, having been previously prepared by melting it into a liquid consistency at about 120 degrees F., above zero, is then poured into the partially frozen cream and agitated all the while to make a mechanical mixture. Since the creamy base is at a very low temperature, it can receive the warm chocolate without going back into the liquid state. The effect of the poured-in chocolate while it is being stirred into the cream will be that it will break up into subdivisions in the form of flakes or particles which will be distributed throughout the mixture, the particles being distinctive and held in suspension in the cream or vehicle.

The mechanical mixture is then subjected to further cooling and preferably stored in a cooling room in the usual manner.

The chocolate can be introduced into the vehicle at any temperature at which it will flow but it is desirable to maintain the chocolate in a fluid state while it is being introduced into the cream, the temperature of the cream being low enough to break the chocolate up into hard flaky particles.

By the term "flaky" I do not wish to infer that the particles are necessarily thin and flat but I use the term as a generic one to include the sub-divided chocolate in any form, whether flakes, pellets, irregular form or fine particles. Therefore, I would have it understood that in the claim where the word "flakes" is used, it is not to be limited to the specific definition of the word.

What I claim and desire to secure by Letters-Patent is:

The method of preparing a confection which consists in heating chocolate to a degree of temperature above the melting point thereof and introducing the same in its heated condition into a vehicle reduced to a temperature low enough, to cause the chocolate to flake off or shatter into relatively small particles of distinct identity held in suspension within the vehicle.

In testimony whereof I affix my signature.

ARMSTEAD M. ALEXANDER.